(12) United States Patent
Helmer et al.

(10) Patent No.: US 8,984,982 B2
(45) Date of Patent: Mar. 24, 2015

(54) PARALLEL KINEMATIC STRUCTURE

(75) Inventors: Patrick Helmer, Bernex (CH); Charles Baur, Jr., St-Aubin-Sauges (CH); Marc Weibel, Steffisburg (CH)

(73) Assignees: Force Dimension S.A.R.L., Nyon (CH); Baur S.S., St. Aubin-Sauges (CH)

( * ) Notice: Subject to any disclaimer, the term of this patent is extended or adjusted under 35 U.S.C. 154(b) by 1433 days.

(21) Appl. No.: 12/446,491

(22) PCT Filed: Oct. 31, 2006

(86) PCT No.: PCT/EP2006/010470
§ 371 (c)(1),
(2), (4) Date: Jul. 16, 2009

(87) PCT Pub. No.: WO2008/052581
PCT Pub. Date: May 8, 2008

(65) Prior Publication Data
US 2010/0192720 A1 Aug. 5, 2010

(51) Int. Cl.
*B25J 17/02* (2006.01)
(52) U.S. Cl.
CPC .................................. *B25J 17/0266* (2013.01)
USPC ..................................... 74/490.01; 74/490.05
(58) Field of Classification Search
USPC ................ 74/490.01, 490.05, 490.08, 490.09
See application file for complete search history.

(56) References Cited

U.S. PATENT DOCUMENTS

| | | | |
|---|---|---|---|
| 6,116,844 A | * | 9/2000 | Hayward ...................... 414/680 |
| 6,453,566 B1 | | 9/2002 | Bottinelli et al. |
| 6,467,762 B1 | | 10/2002 | Davies |
| 6,871,584 B2 | | 3/2005 | Pearson |
| 2005/0132837 A1 | | 6/2005 | Ben Horin et al. |

FOREIGN PATENT DOCUMENTS

| | | |
|---|---|---|
| DE | 10 2004 058 450 | 6/2006 |
| EP | 0 218 546 | 4/1987 |

(Continued)

OTHER PUBLICATIONS

Abstract for DE 10 2004 058 450.
Abstract for EP 0250 470.
Abstract for EP 0 218 546.
Gao, F. et al., "Development of a New Type of 6-DOF Parallel Micro-manipulator and its Control System," Proceedings of the 2003 IEEE International Conference on Robotics, Intelligent Systems and Signal Processing, Changsha, China (Oct. 2003) pp. 715-720.

(Continued)

*Primary Examiner* — William C Joyce
(74) *Attorney, Agent, or Firm* — Frost Brown Todd LLC

(57) ABSTRACT

A parallel kinematic structure comprises at least two kinematic chains being functionally arranged in parallel. Each of the two kinematic chains has, at a moveable end thereof, at least one degree of freedom, and comprising a passive anti-planar joint arrangement having a translational degree of freedom and two rotational degrees of freedom. Each anti-planar joint arrangement has an input section and an output section. At least one of the kinematic chains comprises a planar joint arrangement having at least one of at least one translational degree of freedom and a rotational degree of freedom, the planar joint arrangement having an output section. Further, the planar joint arrangement is adapted for active movements in at least one of its degrees of freedom. The input section of the anti-planar joint arrangement and the output section of the respective planar joint arrangement are coupled. The parallel kinematic structure further comprises a moveable end-effector section coupled with the output sections of the anti-planar joint arrangements.

16 Claims, 33 Drawing Sheets

(56) References Cited

FOREIGN PATENT DOCUMENTS

| EP | 0 250 470 | 6/1987 |
| WO | WO 2006/050560 | 5/2006 |

OTHER PUBLICATIONS

International Search Report dated Aug. 21, 2007 for Application No. PCT/EP2006/010470.

\* cited by examiner

| | |
|---|---|
|  TCP | Tool Center Point (TCP) or local output |
|  | Ground or local input |
| — | constraint on translational DOF (force) |
|  | constraint on rotational DOF (torque) |
| ⇔ | actuated (active) translational DOF (force) |
|  | actuated (active) rotational DOF (torque) |
|  | joint providing one translational DOF (prismatic joint) |
|  | joint providing one rotational DOF (pivot joint) |
|  | joint providing three rotational DOF (spherical or ball joint) |
|  | joint providing two rotational DOF (universal or cardan joint) |

PARALLEL KINEMATIC STRUCTURE

FIELD OF THE INVENTION

The present invention relates, in general, to kinematic structures and, in particular, a kinematic chain for a kinematic structure, which kinematic chain includes a planar joint arrangement and a passive anti-planar joint arrangement, and a kinematic structure including such kinematic chains.

BACKGROUND OF THE INVENTION

So-called parallel kinematic structures are known. For example, U.S. Pat. No. 6,453,566 B1, U.S. Pat. No. 6,467,762 B1, U.S. Pat. No. 6,871,584 B2, EP 218546 B1 and EP 250 470 B1 disclose structures of this type.

Non-parallel kinematic structures providing up to 6 degrees of freedom (DOFs) usually offer large motion ranges but have a high inertia because actuators are arranged within and carried by the structure and have a low stiffness because forces and torques are transmitted through a single kinematic chain. As a result, mechanical eigen-frequencies are commonly low.

Parallel kinematic structures also providing up to 6 DOFs allow to reduce inertia because heavy components (e.g. actuators) may be arranged on ground and to increase stiffness because more than one kinematic chain acts "in parallel" on an end-effector. However, their motion ranges may be, as compared with non-parallel kinematic structures, reduced.

OBJECT OF THE INVENTION

The object of the present invention is to provide a parallel kinematic structure having enhanced characteristics concerning fabrication, costs and operability as compared with known parallel kinematic structures.

SHORT DESCRIPTION OF THE INVENTION

To solve the above object, the present invention provides a parallel kinematic structure and uses thereof.

In particular, a parallel kinematic structure comprises at least two kinematic chains being functionally arranged in parallel. Each of the two kinematic chains has, at a moveable end thereof, at least one degree of freedom, and comprises a passive anti-planar joint arrangement having a translational degree of freedom and two rotational degrees of freedom. Each anti-planar joint arrangement has an input section and an output section.

At least one of the kinematic chains comprises a planar joint arrangement having at least one of at least one translational degree of freedom and a rotational degree of freedom. The planar joint arrangement has an output section. The output section of the planar joint arrangement and input section of the respective anti-planar joint arrangement are coupled.

The parallel kinematic structure further comprises a moveable end-effector section coupled with the output sections of the anti-planar joint arrangements.

The parallel kinematic structure according to the present invention may be used in a robot, a manipulator (e.g. telemanipulator, slave device in a master-slave-arrangement), a haptic device (e.g. with force feedback, force reflection towards a user), an input device (e.g. master input device in a master-slave-arrangement), a measurement device (e.g. including a touch probe), in an apparatus for at least one of simulation and training and/or in an apparatus for at least one of holding, positioning and moving a medical instrument (e.g. surgical/endoscopic instruments, instruments for minimal invasive medicine/surgery, video endoscopes, endoscopic cameras).

Further, features and advantages of the present invention are set forth below in the description, figures and claims.

SHORT DESCRIPTION OF THE DRAWINGS

The present invention will be discussed in greater detail in with reference to the accompanying drawing, in which:

FIG. 1 shows graphical symbols used in the drawings and their meaning;

Figure 5:
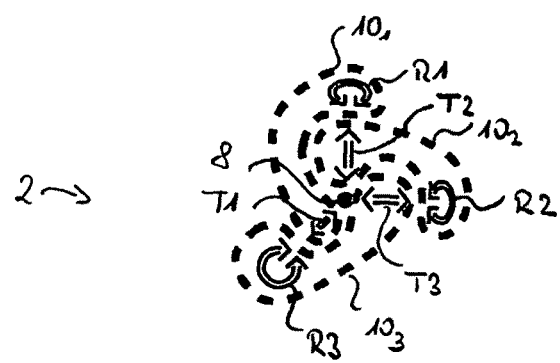
FIG. 5 shows the functional representation of FIG. 4 wherein DOFs are associated to different kinematic chains.
Figure 7:
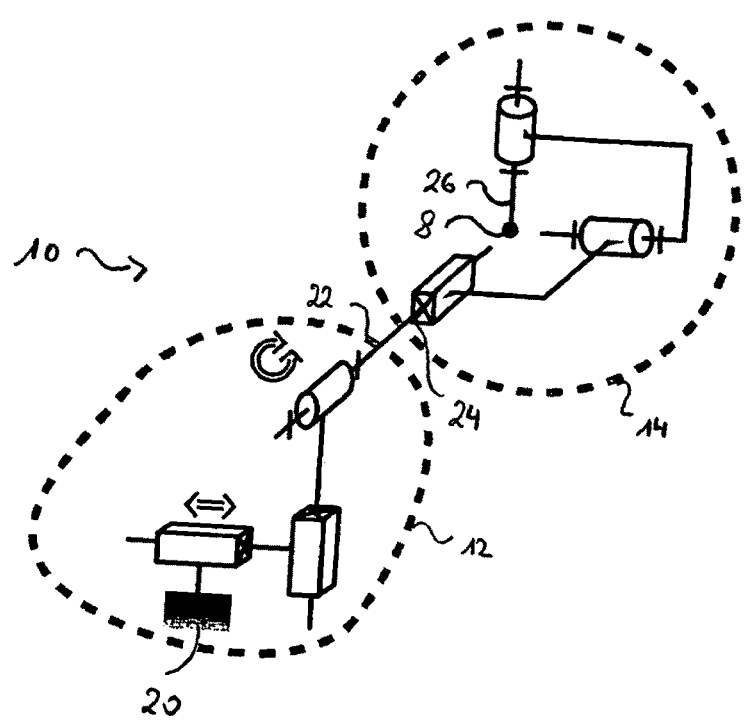
Figure 8:
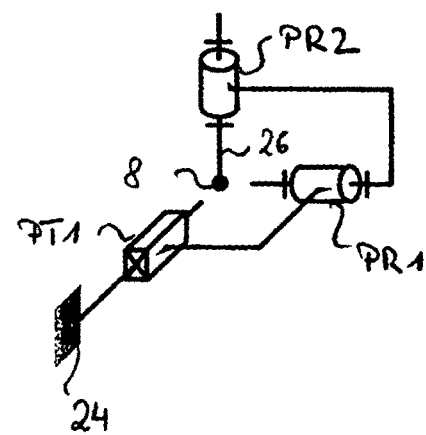
Figure 9:
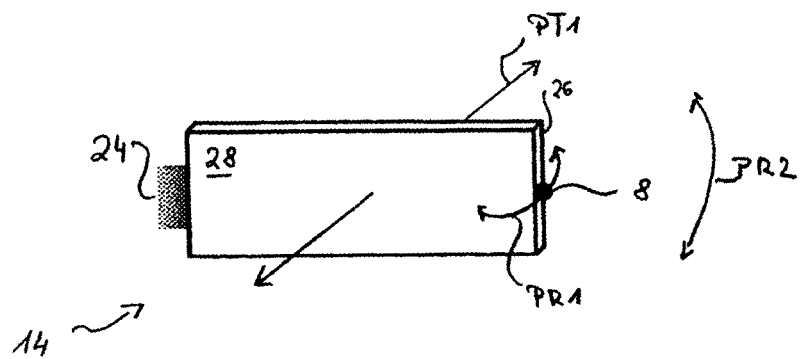
Figure 10:
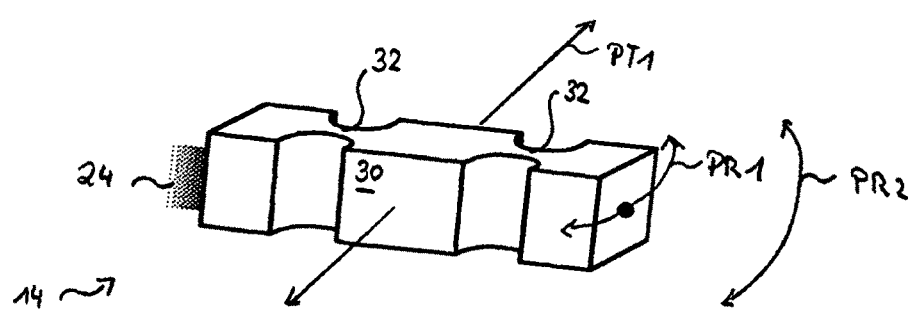
Figure 11:
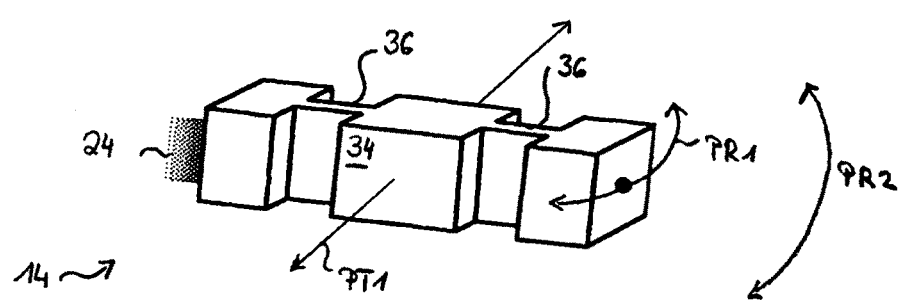
Figure 12:
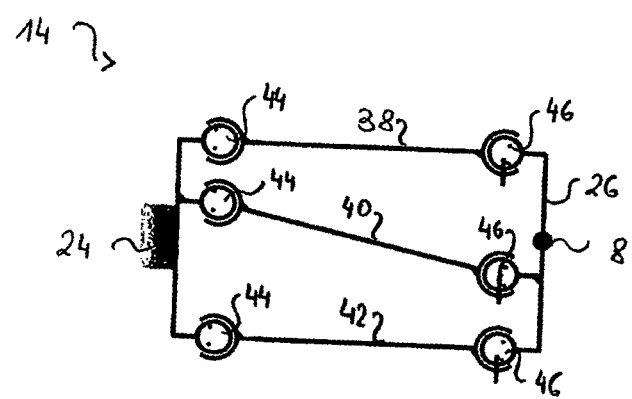
Figure 13:
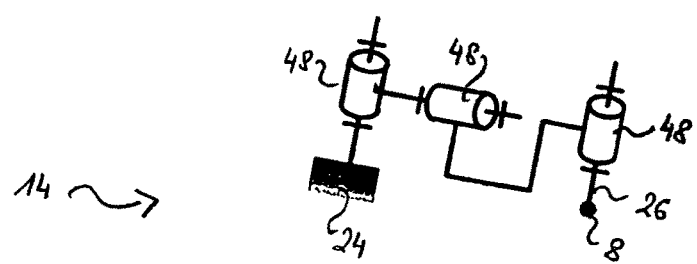
Figure 14:
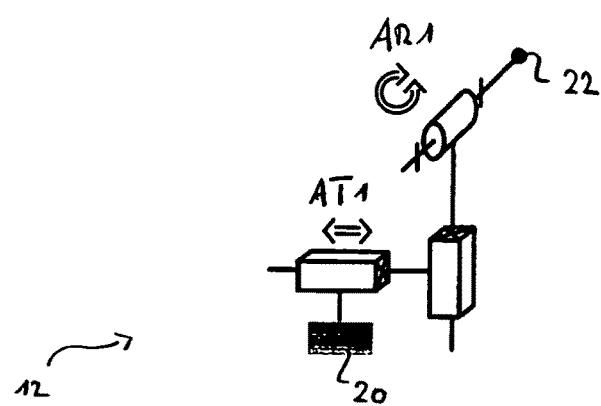
Figure 15:
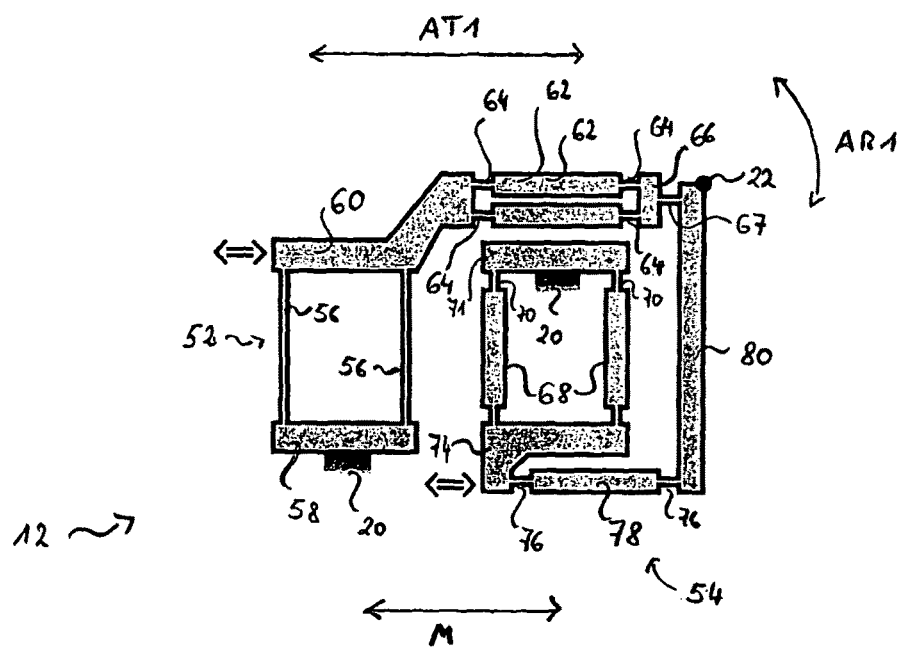
Figure 16:
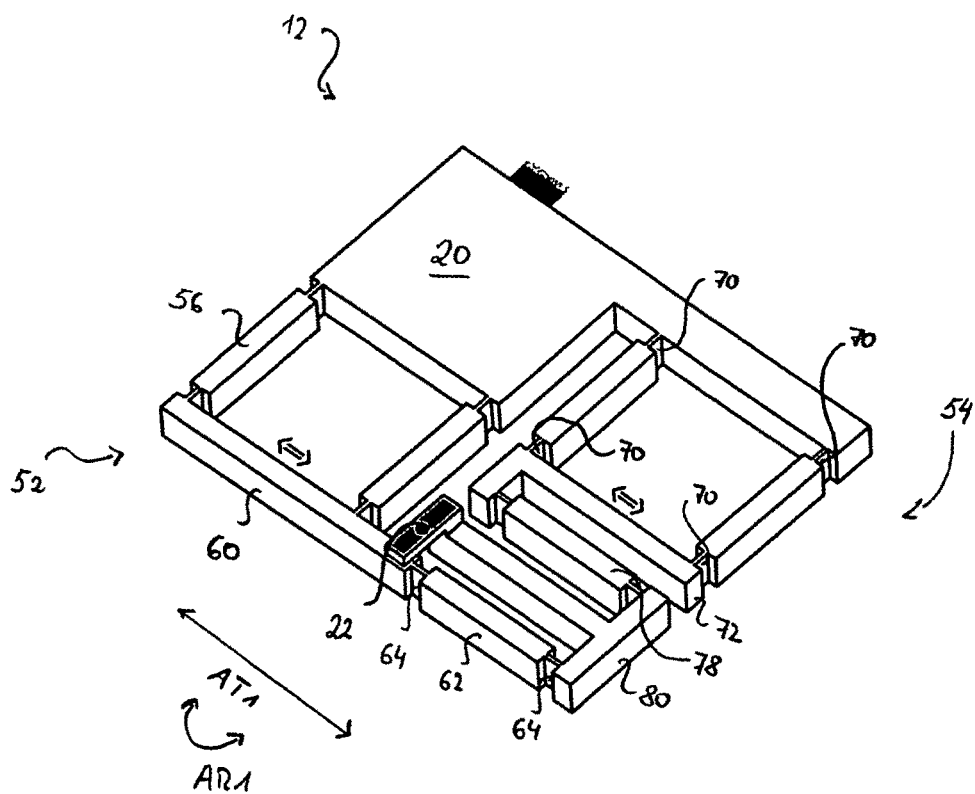
Figure 17:
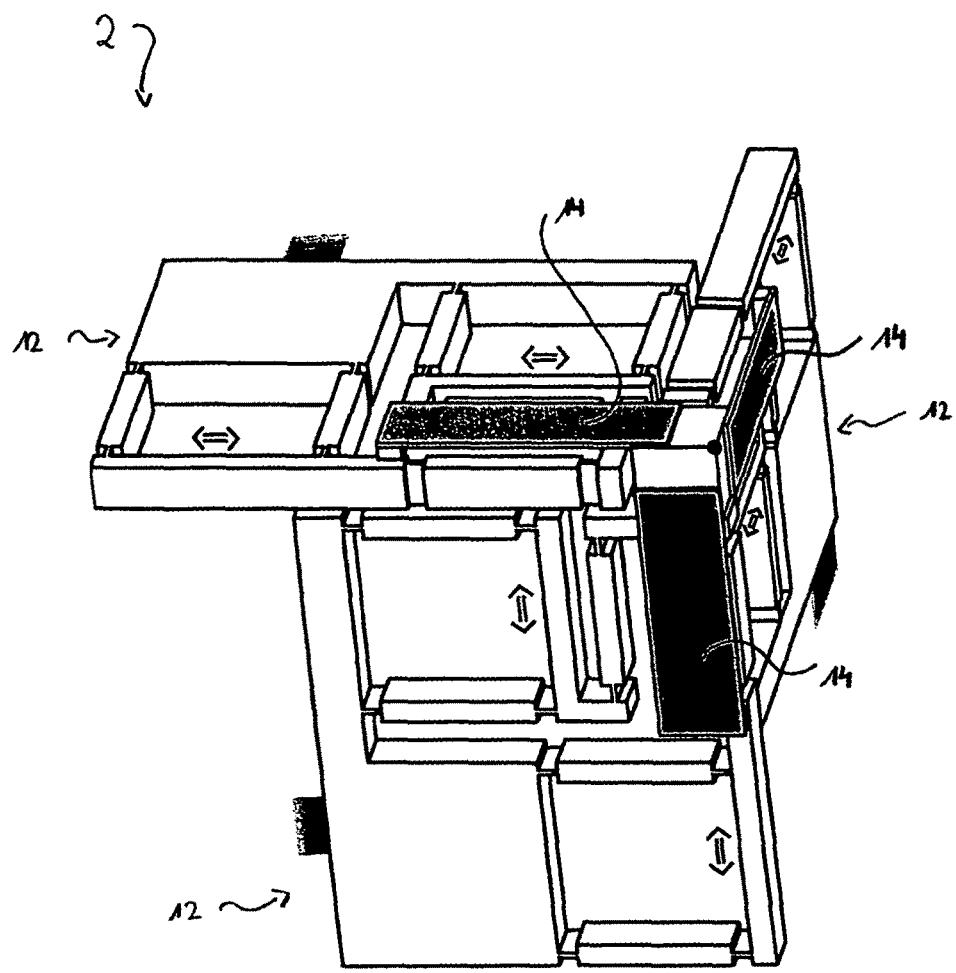
Figure 18:
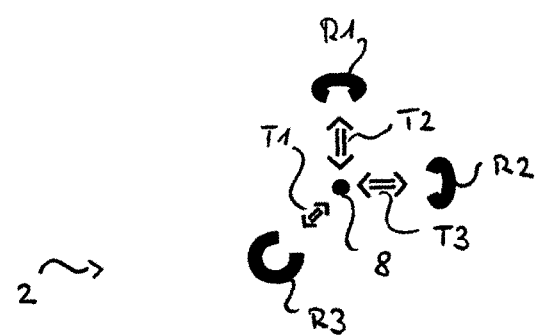
Figure 19:
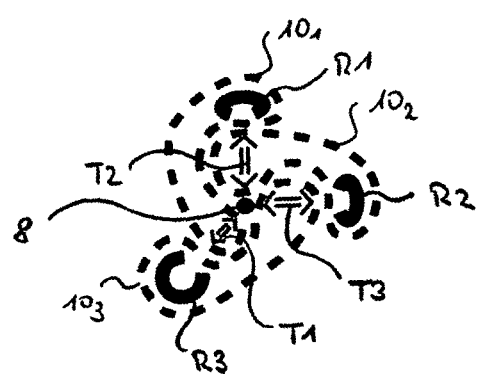
Figure 20:
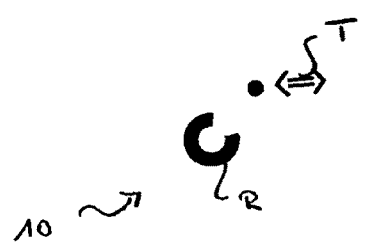
Figure 21:
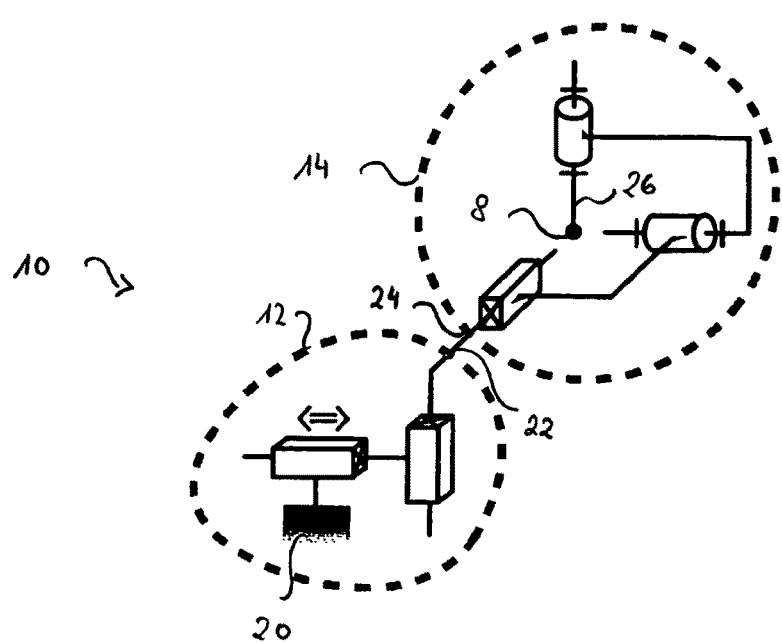
Figure 22:
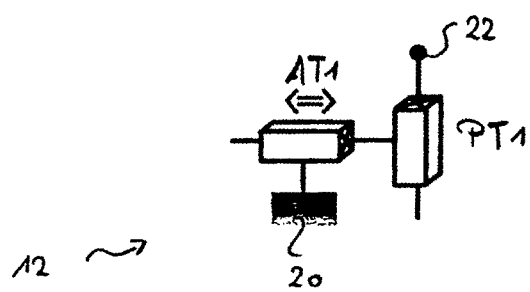
Figure 23:
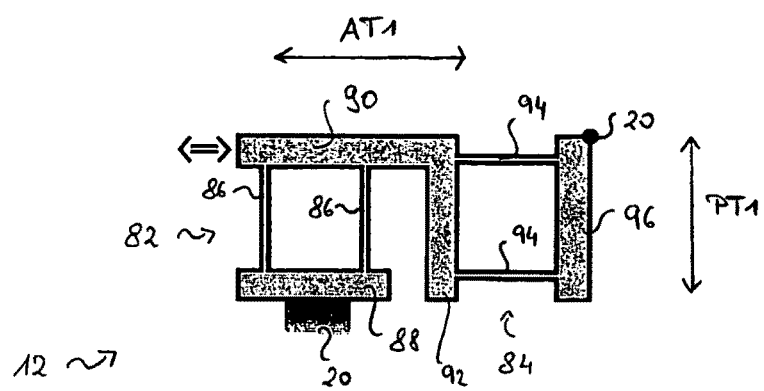
Figure 24:
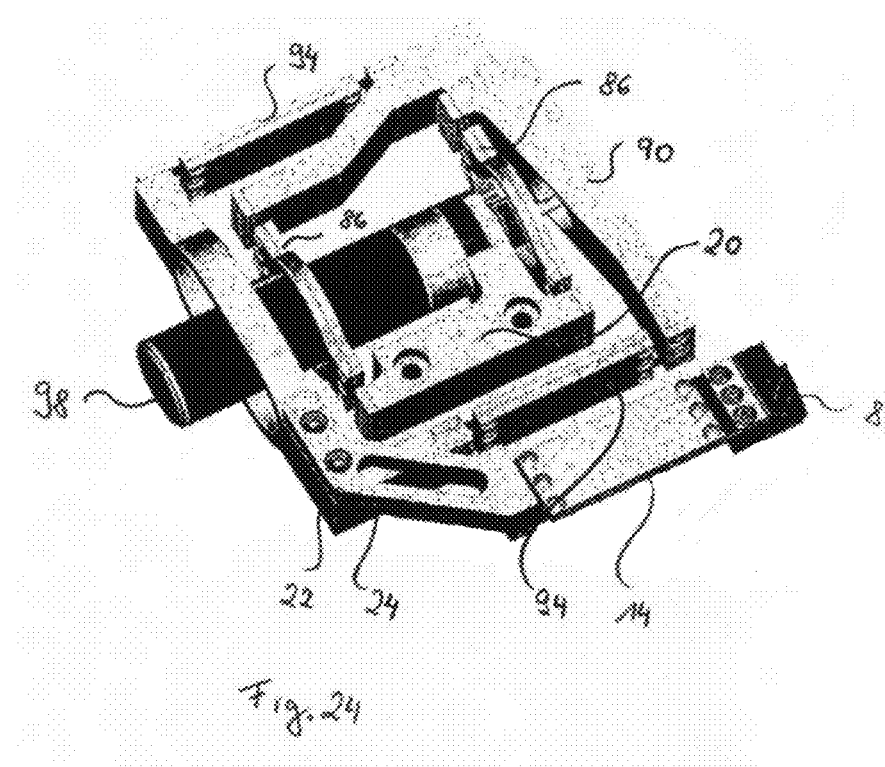
Figure 25:
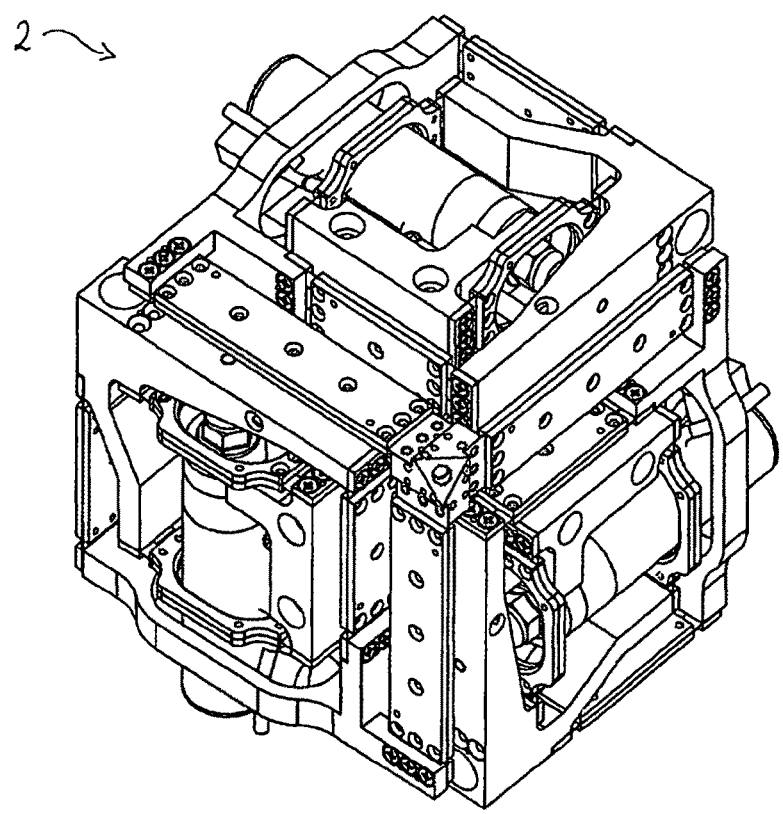
Figure 26:
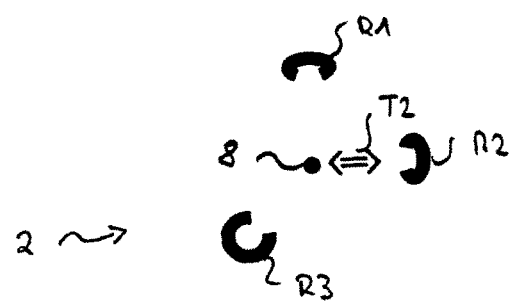
Figure 27:
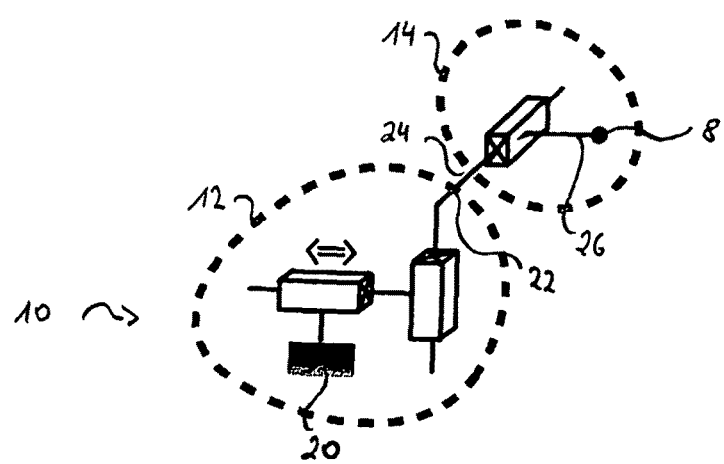
Figure 28:
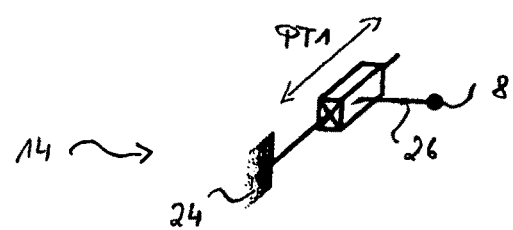
Figure 29:
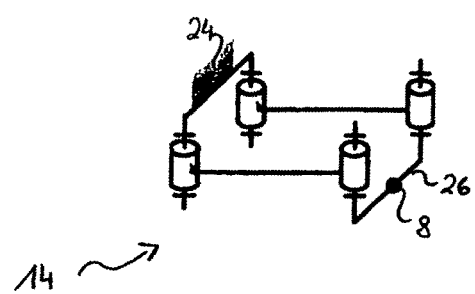
Figure 30:
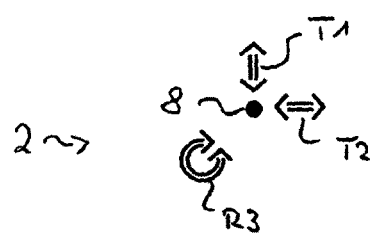
Figure 31:
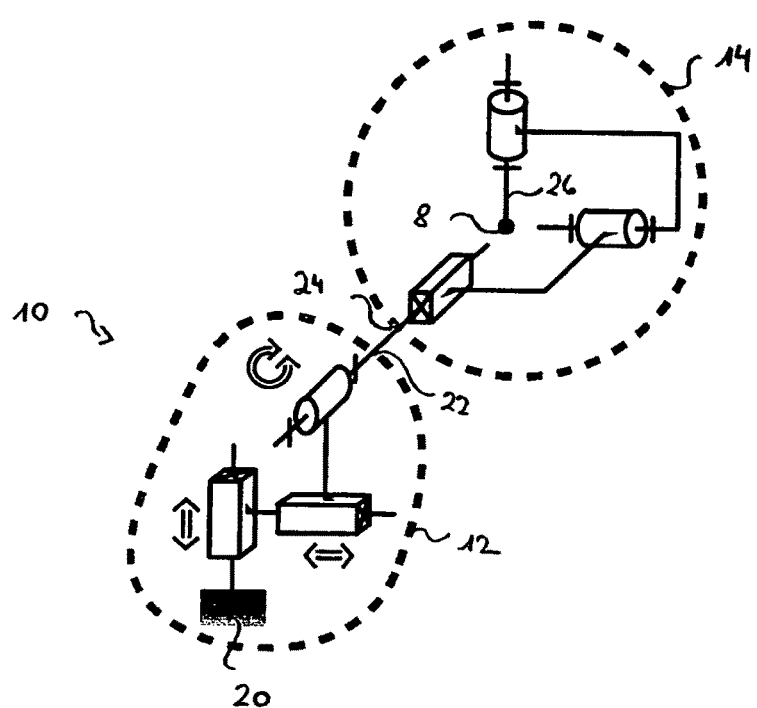
Figure 32:
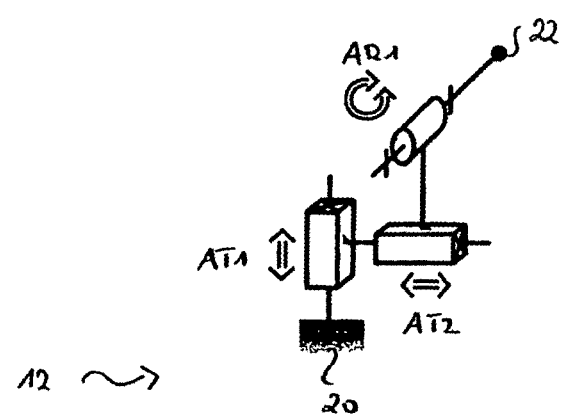

FIG. 7 schematically illustrates an exemplary embodiment for a kinematic chain assumed for FIG. 5, which embodiment including an active planar joint arrangement and a passive anti-planar joint arrangement;

FIG. 8 shows the passive anti-planar joint arrangement of FIG. 7;

FIG. 9 schematically illustrates an embodiment of the passive anti-planar joint arrangement of FIGS. 8 and 9 including solid state compliant or flexure joint in form of a beam providing distributed elastic deformation;

FIG. 10 schematically illustrates an embodiment of the passive anti-planar joint arrangement of FIGS. 8 and 9 including solid state compliant or flexure joints in form of a bar having two notch hinges providing local elastic deformation;

FIG. 11 schematically illustrates an embodiment of the passive anti-planar joint arrangement of FIGS. 8 and 9 including solid state compliant or flexure joints in form of a bar having two straight hinges providing local elastic deformation;

FIG. 12 shows an embodiment of the passive anti-planar joint arrangement of FIGS. 8 and 9 including three bars having spherical and/or universal joints;

FIG. 13 shows a functional representation of an embodiment of the passive anti-planar joint arrangement of FIGS. 8 and 9 by means of three pivot joints functionally arranged in series;

FIG. 14 shows a functional representation of the active planar joint arrangement of FIG. 7;

FIG. 15 schematically illustrates an embodiment of the active planar joint arrangement of FIG. 14 including a parallel structure of two kinematic sub-chains, each kinematic sub-chain having an actuateable parallelogram structure (two beams or two hinged bars) and being coupled with a bar having two hinges or a serial arrangement of a parallelogram structure (two beams or two hinged bars) and a hinge;

FIG. 16 schematically illustrates an embodiment of the active planar joint arrangement of FIG. 14 comparable with the embodiment of FIG. 15 and in a monolithical design;

FIG. 17 schematically illustrates an embodiment of a parallel kinematic structure including The embodiments of FIGS. 9 and 16 arranged as three kinematic chains and having six DOFs actuatable by three force generating (e.g. linear) actuators;

FIG. 18 shows a functional representation of a parallel kinematic structure having three active translational DOFs and three constrained rotational degrees of freedom DOFs;

FIG. 19 shows the functional representation of FIG. 18 wherein DOFs are associated to different kinematic chains;

FIG. 20 shows DOFs (active and constrained) of a kinematic chain of FIG. 19;

FIG. 21 schematically illustrates an exemplary embodiment for a kinematic chain assumed for FIG. 19, which embodiment including an active planar joint arrangement and a passive anti-planar joint arrangement;

FIG. 22 shows the active planar joint arrangement of FIG. 21;

FIG. 23 schematically illustrates an embodiment of the active planar joint arrangement of FIGS. 21 and 22 including parallelogram structures and in a monolithical design;

FIG. 24 schematically illustrates an embodiment of the kinematic chains of FIG. 21 having (e.g. laser-cut steel) beams, reinforced central components and an (e.g. linear) actuator;

FIG. 25 schematically illustrates an embodiment of a parallel kinematic structure including the embodiment of FIG. 24 arranged as three kinematic chains and having three actuated translation DOFs;

FIG. 26 shows a functional representation of a kinematic chain having one active translational DOF and three (all) constrained rotational DOFs;

FIG. 27 schematically illustrates an exemplary embodiment for the kinematic chain of FIG. 26, which embodiment including an active planar joint arrangement and a passive anti-planar joint arrangement;

FIG. 28 shows the anti-planar joint arrangement of FIG. 27 as single prismatic joint;

FIG. 29 schematically illustrates an exemplary embodiment of the anti-planar joint arrangement of FIG. 27 having a parallelogram structure (including two beams or two notched bars);

FIG. 30 shows a functional representation of a kinematic chain having two active translational DOFs and one active rotational DOF;

FIG. 31 schematically illustrates an exemplary embodiment for the kinematic chain of FIG. 30, which embodiment including an active planar joint arrangement and a passive anti-planar joint arrangement;

FIG. 32 shows the planar joint arrangement of FIG. 31; and

Figure 33:
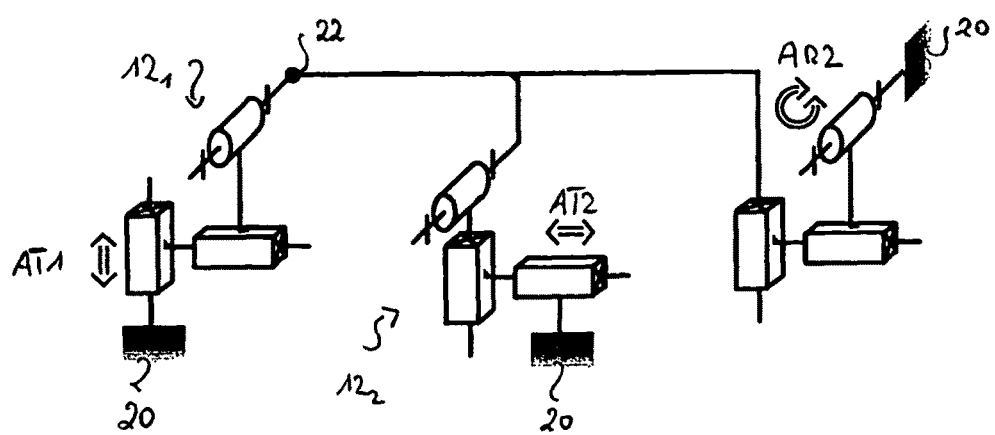

FIG. 33 shows a schematical representation of an exemplary embodiment of a planar joint arrangement for the kinematic chain of FIG. 30.

DESCRIPTION OF PREFERRED EMBODIMENTS

Before a detailed description of the accompanying drawings, some further aspects of the present invention will be discussed.

In a preferred embodiment, the planar joint arrangement may be adapted for active movements in at least one of its degrees of freedom.

In another embodiment, at least one of the anti-planar joint arrangement, the planar joint arrangement, the kinematic chains and the may be formed as monolithical part or piece.

If the parallel kinematic structure comprises one or more kinematic chains having no planar joint arrangement, at least one of the input sections of the anti-planar joint arrangement of these kinematic chains may be fixed or rigidly connected, for example to a base or support of the parallel kinematic structure.

In an embodiment, the at least one planar joint arrangement (i.e. planar joint arrangement of the at least one kinematic chain) may have a base section, which is fixed or rigidly connected, for example to a base or support of the parallel kinematic structure.

In a further embodiment, at least one of the anti-planar joint arrangements, preferably each of the anti-planar joint arrangements, comprises at least one solid state compliant or flexure joint. A solid-state compliant/flexure joint provides displacement, movement, rotation and the like by the means of deformation of solid matter or material. Such a deformation include a local deformation limited to a certain, confined portion of the solid material and/or a distributed deformation existing in a larger portion of the material or even extending throughout the material. Examples for solid-state compliant joints using local deformation include flexure joints or notch hinges having straight, circular, elliptical or other shapes, crossed flexure hinges, elastic wire joints of circular, elliptical, square, rectangular or other cross sections. Examples for solid state compliant joints using distributed deformation include at least partially elastically deformable beams, bars, torsion bars, lamellas, bellows, membranes and the like, which may be arranged in parallelogram form having two or more deformable components.

Using appropriate materials, specifically for the planar and anti-planar joint arrangements and, if applicable, its solid state compliant joints, the parallel kinematic structure or at least parts thereof can be made disposable (single use, through-away product) and/or sterilisable. To this end it might be helpful to design the parallel kinematic structure to enable detachment of mechanical parts, for example, actuators and sensors.

Solid-state compliant joints have several advantages, for example:
  no dry friction, no stock-slip effect
  no wear, no gripping
  no need for lubricants or maintenance
  no mechanical plate
  no mechanical resolution limit, ultra-high repeatability
  high predictability of elastic behavior (geometrical, static and dynamic)
  high stiffness, no need for preloading of joints same component)
  scalability (miniaturization)
  compatibility with clean room, medical and/or vacuum environments
  compatibility with dirty, dusty, sandy etc. environments
  compatibility with humid or liquid environments
  possibility to desinfect or sterilize
  X-ray compatibility.

In an embodiment, at least two of the degrees of freedom of the anti-planar joint arrangement are orthogonal to each other. Particularly, it is possible that the axis of the translational degree of freedom of the anti-planar joint arrangement is perpendicular to a plane defined by the axes of the rotational degrees of freedom of the anti-planar joint arrangement.

In this embodiment, the anti-planar joint arrangement may be realized by at least one elastically deformable beam or hinged bar, which may be arranged to form a deformable parallelogram arrangement.

In a further embodiment, at least two of the degrees of freedom of the planar joint arrangement are orthogonal to each other. In particular, the axis of the rotational degree of freedom of the planar joint arrangement may be perpendicular to a plane defined by the axes of the translational degrees of freedom of the planar joint arrangement.

In this embodiment, the planar joint arrangement may include pivot joints, which may be comprised by a parallelogram arrangement, having all their rotation axis mutually parallel and perpendicular to the plane formed by the translational axis.

It is noted that in embodiment having degrees of freedom perpendicular to each other, the orthogonality may be present for given or predefined condition or situation only, for example in condition of no operation or a (initially) state of rest.

It is possible that the anti-planar joint arrangement and/or the planar joint arrangement comprise(s) at least two kinematic sub-chains, which are functionally arranged in parallel.

At least one, preferably each, of the at least two kinematic sub-chains comprises at least one solid state compliant joint. Here, the above observations concerning solid-state compliant joints also apply.

In the case of an anti-planar joint arrangement, the at least two kinematic sub-chains respectively may have input ends comprised by the input section of the anti-planar joint arrangement. Further, the at least two kinematic sub-chains may respectively have output ends comprised by the output section of the anti-planar joint arrangement.

In the case of a planar joint arrangement, the at least two kinematic sub-chains may respectively have output ends comprised by the output section of the planar joint arrangement.

The parallel kinematic structure may comprise at least one actuator for acting on the planar joint arrangement for a generation of movements in the at least one degree of freedom of the planar joint arrangement. Examples for such an actuator include electro-magnetic actuators, piezoelectric actuators, electric actuators, magnetic actuators, rheologic fluid actuators, hydraulic actuators, pneumatic actuators, inertial drive actuators, impact drive actuators, stick and slip actuators, ultrasonic actuators, bellow actuators, shape memory alloy actuators and thermal actuators.

The parallel kinematic structure may comprise at least one sensor unit for measuring at least one of
    relative movements of at least two components of the parallel kinematic structure,
    absolute positions of at least one component of the parallel kinematic structure, and deformation of at least one component of the parallel kinematic structure,
and providing information representing the measurements.

In the case the at least one sensor unit may determine deformation of at least one component of the parallel kinematic structure (e.g. of an elastic beam, a hinged bar, an parallelogram arrangement, . . . ), the at least one sensor unit may provide information on the deformation and/or provide information representing respective relative movements and/or absolute position(s). Information representing respective relative movements and/or absolute position(s) based on deformation information from the at least one sensor unit may (also) be determined by a control unit discussed below.

The at least one sensor unit may by also adapted to measure at least one of torques and forces acting on at least one component of the parallel kinematic structure. This allows, for example, to provide force/torque-feedback on the end-effector section and/or force/torque-input from a user. Determination of at least one of torques and forces may be also accomplished by a specifically dedicated sensor unit provided in addition to the above sensor unit.

Examples for such a sensor unit include electrical and/or optical position sensors, extensometers, strain gages, inductive sensors, magnetic sensors, hall effect sensors, capacitive sensors, magnetoresistive sensors and magnetostrictive sensors. In an embodiment, such a sensor unit may be integrally comprised by an actuator acting on the planar joint arrangement. Information representing measured relative movements may include raw data, processed data and signals.

The parallel kinematic structure may comprise a determination unit for determination of at least one of movements and position of the end-effector section. The determination unit may use, if applicable, information provided by the at least one sensor unit to determine movements and/or positions of the end-effector section. As alternative or in addition, the determination unit may use movement and/or position information provided by an apparatus directly monitoring movements and/or position of the end-effector section. Examples for such an apparatus include a device for optically measuring movements and/or positions in three dimensions.

In particular, the determination unit may be adapted to determine movements and/or position of the end-effector section on the basis of the information provided by the at least one sensor unit and a mathematically model. The mathematical model may map measured relative movements of at least two components of the parallel kinematic structure to movements and/or position of the end-effector section.

The parallel kinematic structure may further comprise at least one device, which is coupled to the end-effector section and provides at least one degree of freedom and/or active movements.

In an embodiment, the parallel kinematic structure may comprise a base or support to which the at least two kinematic chains are mounted.

In such an embodiment, the parallel kinematic structure may comprise at least one device, which is coupled with the base or support and is adapted to move the parallel kinematic structure and/or to provide, at its base or support, at least one degree of freedom.

Examples for the above device(s) providing at least one degree of freedom and/or movement include a parallel kinematic structure according to the present invention, a robot, a robotic arm, a passive lockable positioning arm, a coarse positioning apparatus, a joint, a hinge, a gripper, a grasper and an interface to a tool or instrument.

The parallel kinematic structure may comprise a control unit for controlling its operation. The control unit, or at least parts thereof, may be integrally formed with a base or support of the parallel kinematic structure and/or arranged as separate/remote device. The control unit may particularly control activation of the at least one planar joint arrangement, processing of information providing by the at least one sensor unit and/or the determination unit. The control unit may include an interface or connection for a communication with at least one of a computer based system, display device (as for example a monitor, a stereoscopic monitor and a head mounted display), input device (as for example a force sensing device, a movement sensing device, a haptic device, a force feedback device, a joystick, a keyboard and a keypad), output device (as for example a robotic device), memory device and printer.

In general, the present invention provides a family of parallel kinematic structures, which family may be described as follows:
    Three kinematic chains connected "in parallel" to the end-effector, each kinematic chain being composed of a series of a first chain and a second chain.
    The first chain may provide up to three degrees of freedom, some or all of which can be actuated (or "active"), arranged as a planar joint arrangement (e.g. two translational degrees of freedom and one rotational degrees of freedom with its rotational axis perpendicular to the plane defined by the two translational degrees of freedom). The first chain may be realized by multiple sub-chains in parallel. Every "missing" degree of freedom (with respect to the three degree of freedom planar joint) will constrain a degree of freedom of the end-effector section.

The second chain realizes a passive anti-planar joint arrangement (e.g. two rotational degrees of freedom and one translational degree of freedom perpendicular to a plane defined by the two rotational degrees of freedom). The second chain includes, for example, a beam or bar (eventually with a reinforced central part). For parallel kinematic structures of the present invention structures without rotational degrees of freedom, the anti-planar joint arrangement may realized by a parallelogram, for example with two beams.

A selectable number of constrained and active degrees of freedom in each chain result in a family of structures with various numbers of degrees of freedom.

The degrees of freedom need not be aligned orthogonally along Cartesian reference frame vectors. Orthogonally aligned degrees of freedom however may simplify comprehension and design of the present invention.

The kinematic chains may incorporate flexure joints.

A parallel kinematic structure according to the present invention may be part of a structure or robotic architecture with more degrees of freedom. For example, a parallel kinematic structure according to the present invention may be arranged before and/or following a structure or robotic architecture with more degrees of freedom (e.g. the output end or end-effector of a robot coupled to the base of the parallel kinematic structure may coupled; an active grasper mechanism coupled to the end-effector section of the parallel kinematic structure).

A parallel kinematic structure according to the present invention may be used in several applications due to its application independent concept and can be, for example, used as a robot (industrial robot arm, machining robot), a manipulator (handling, tool or instrument holding device, medical device, sample movement device as in biology), a simulation and training apparatus, a haptic device, a master input device for interaction with a virtual environment or for tele-operation of one or several slave manipulators), an active or passive measurement device (touch probe, AFM, MFM, . . . ).

The embodiments described with reference to the accompanying drawings may be modified by, e.g., inserting and/or removing joints without changing the geometrical behavior.

FIG. 1 illustrates symbols used in the drawings and their respective meanings.

Figure 2:
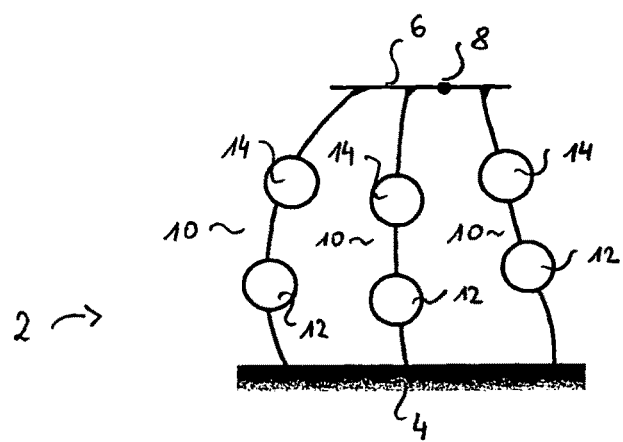
FIG. 2 shows a schematical illustration of three kinematic chains functionally arranged in parallel.

FIG. 2 schematically illustrates the general concept of a parallel kinematic structure according to the present invention. A parallel kinematic structure 2 comprises a base or support 4 and an end-effector section 6. The end-effector section 6 may have a shape extending in a plane or volume. Then, it may be necessary to define a location on the end-effector section 6, for which location movements and/or positions of the parallel kinematic structure 2 are calculated and provided. This location is also referred to a tool center point 8.

Between base/support 4 and end-effector section 6, three parallel kinematic chains 10 are arranged. The kinematic chains 10 may differ in their design and structure. Each kinematic chain 10 comprises a planar joint arrangement 12 and an anti-planar joint arrangement 14. The planar joint arrangements 12 may have different structures and designs. This also applies to the anti-planar joint arrangements 14. The planar joint arrangements 12 each provide at least one degree of freedom that is not constrained (i.e. movements in this degree of freedom are possible) and, particularly, that may be actively controlled and/or actuated. The anti-planar joint arrangements 14 are passive and do not include a degree of freedom, which may be actively controlled and/or activated. Rather, degrees of freedom of the anti-planar joint arrangements 14 are either not constrained to allow movements in the respective direction or are constrained hindering movements along therewith.

The parallel kinematic structure 2 may be, as shown in FIG. 2, stationary with its base/support 4 mounted on a stationary place.

The parallel kinematic structure 2 may be however movable for example by means of a robotic architecture 16 coupled with base/support 4. Robotic architecture 16 may be a conventional robot arm or the like. However, it is also possible to use a further parallel kinematic structure, the end-effector section of which being coupled with base/support 4 of parallel kinematic structure 2.

Figure 3:
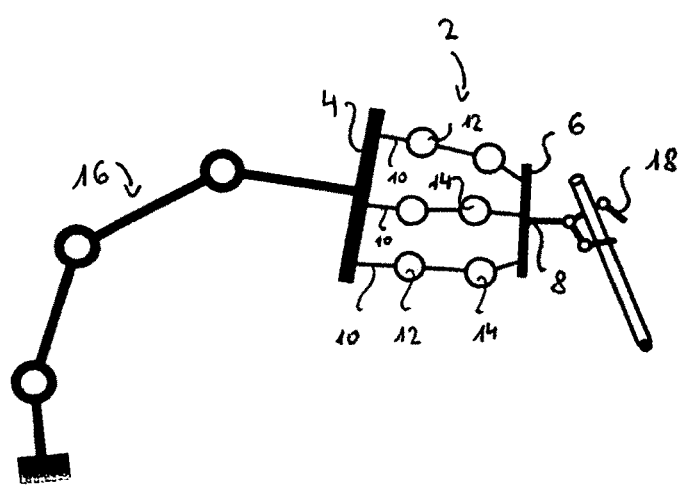
FIG. 3 shows a schematical illustration of three kinematic chains functionally arranged in parallel and being coupled to a positioning/movement stage and a gripping device.

Irrespective of whether or not parallel kinematic structure 2 is stationary, as shown in FIG. 3, a gripper, manipulator, holding device or the like 18 may be coupled with end-effector section 6. Preferably, device 18 is coupled to end-effector section 6 such that tool center point 8, as output of parallel kinematic structure 2, and a respective input location of device 18 coincide.

Device 18 may be used, for example, to hold medical/surgical instruments, such as those used in microsurgery, endoscopic and paraendoscopic surgery, endoscopic instruments, flexible or rigid catheters, radiofrequency intruments, cautering instruments, suture instruments, scissors, pinchers, cameras, imaging devices, probes and the like.

Figure 4:
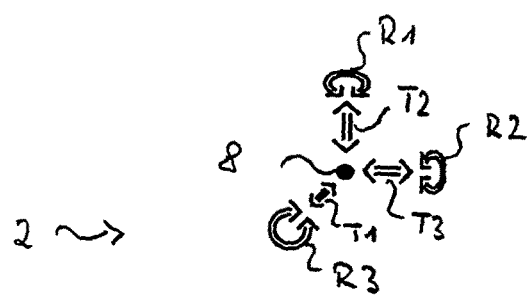
FIG. 4 shows a functional representation of a parallel kinematic structure having three active translational degrees of freedom (DOFs) and three active rotational degrees of freedom (DOFs), a total of six degrees of freedom (DOFs)

FIG. 4 schematically represents degrees of freedom of a parallel kinematic structure having six active degrees of freedom (or motion components), namely three rotational degrees of freedom R1, R2, R3 and three translational degrees of freedom T1, T2 and T3. FIG. 8 shows the degrees of freedom in relation to tool center point 8.

FIG. 5 shows the illustration of FIG. 4 in association to kinematic chains 10. In particular, rotational degree of freedom R1 and translational degree of freedom T1 are associated to a kinematic chain $10_1$, rotational degree of freedom R2 and translational degree of freedom T2 are associated to a kinematic chain $10_2$ and rotational degree of freedom R3 and translational degree of freedom T3 are associated to a kinematic chain $10_3$.

Figure 6:
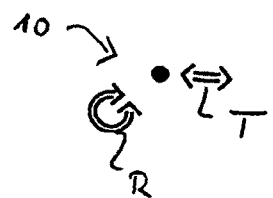
FIG. 6 shows active DOFs of a kinematic chain of FIG. 5.

FIG. 6 shows a portion of FIGS. 4 and 5, namely active degrees of freedom of one of the kinematic chains of FIG. 5. In order to promote an understanding, it is simply assumed that the kinematic chains of FIG. 5 have the same structure and design. Therefore, they are commonly referred to by reference numeral 10. In line therewith, rotational degrees of freedom and translational degrees of freedom are referred to by reference numerals R and T, respectively.

FIG. 7 illustrates and exemplary embodiment of a kinematic chain 10, which may be used for the parallel kinematic structure of FIGS. 4 to 6. Kinematic chain 10 comprises, as set forth above, planar joint arrangement 12 and anti-planar joint arrangement 14. Planar joint arrangement 14 has a base section 20 coupled (directly or indirectly) with base/support 4, preferably such that base section 20 remains fixed during operation. Planar joint arrangement 12 further comprises an output section 22.

Anti-planar joint arrangement 14 comprises an input section 24 coupled with output section 22 of planar joint arrangement 12. Anti-planar joint arrangement 14 further comprises an output section 26 coupled with tool center point 8.

FIG. 8 illustrates anti-planar joint arrangement 14 of FIG. 7 having three passive degrees of freedom, namely passive translational degree of freedom PT1 and two passive rotational degrees of freedom PR1 and PR2. Designs for realization of anti-planar joint arrangement 14 are shown in FIGS. 9 to 13.

Anti-planar joint arrangement 14 may include, as illustrated in FIG. 9, a solid-state compliant (or flexure) joint in form of a beam 28. Passive translational degree of freedom PT1 allows movements along an axis perpendicular to the beam 28 plane. Passive rotational degree of freedom PR2 is provided by bending deformation of beam 28 with respect to input section 24 along an axis parallel to beam 28 plane and perpendicular to its longitudinal axis. Torsion deformation of beam 28 along its longitudinal axis provides, at least at output section 26, a rotation having a rotational axis parallel with the longitudinal axis of beam 28 and, thus, provides passive rotational degree of freedom PR1.

In a comparable manner, the passive degrees of freedom of anti-planar joint arrangement 14 may be provided by a bar 30 shown in FIG. 10. Bar 30 includes two circular notched hinges 32. A comparable result can be achieved by using a bar 34 having, as illustrated in FIG. 11, two straight hinges or flexure portions of different shape(s). Hinged bar 34 can be replaced by a beam 28 with a reinforced central part.

A further embodiment of anti-planar joint arrangement 14 is shown in FIG. 12. Here, three bars 38, 40 and 42 each have a universal joint 46 on one end and a spherical joint 44 on the other end. Joints 44 are coupled with input section 24 and joints 46 are coupled with output section 26. Any one of the universal joints 46 can be replaced by a spherical joint. In any of the bars 38, 40 and 42, joints 44 and 46 can be exchanged. Spherical joint 44 can be replaced by a serial arrangement of three pivot joints or hinges, or a single flexible wire joint. Universal joint 46 can be replaced by a serial arrangement of two pivot joints or hinges.

As shown in FIG. 13, planar joint arrangement 14 may comprise, arranged between input section 24 and output section 26, three pivot joints 48 arranged in series.

FIG. 14 shows a planar joint of FIG. 7. Planar joint arrangement 12 includes an active translational degree of freedom AT1 and an active rotational degree of freedom AR1.

A possible embodiment of planar joint arrangement 12 is shown in FIG. 15. Here, planar joint arrangement 12 includes a first parallel arrangement 52 and a second parallel arrangement 54. First parallel arrangement 52 includes two beams 56. Beams 56 are coupled to a base bar 58. Bars 58 itself is substantially rigid. On their other ends, beams 56 are coupled to an arm 60. Arm 60 is in turn coupled to 30 output section 22 through a serial arrangement of a parallelogram structure (two bars 62 hinged by means of solid-state compliant joints 64) and a hinge 67. Connecting bar 66 connects parallelogram structure with hinge 67. Base bar 58 of first parallelogram arrangement 52 is coupled with base section 20.

Second parallelogram arrangement comprises two bars 68 connected, by means of solid state compliant joints 70, with a base bar 71. The other ends of bars 68 are coupled by means of solid state compliant joints with a connecting bar 74, which in turn is coupled by means of a solid state compliant joint 76 with a bar 78. Bar 78 is coupled, again by means of a solid-state compliant joint, with an arm 80, the other end of which being coupled with output section 22. Base bar 71 of second parallelogram arrangement 54 is coupled with base section 20.

For providing active movements in the active translational degree of freedom AT1 and the active rotational degree of freedom ARI, actuators (not shown) may act on first parallelogram arrangement 52 and second parallelogram arrangement 54. An actuator may act (directly or indirectly) on arm 60 in the directions indicated by arrow M in order to deform first parallelogram arrangement 52. Another actuator may act on connecting bar 74 in the directions indicated by arrow M in order to deform second parallelogram arrangement 54.

In the case the actuators act on arm 60 and connecting bar 74, respectively, in the same direction and such that their movements synchronized with respect to phase and amplitude (to the right side or to the left side of FIG. 15, each thereof in phase and with same amplitude), movements in active translational degree of freedom AT1 are possible.

In the case the actuators act on arm 60 and connecting bar 72, respectively, in opposite directions (e.g. arm 60: to the right, connecting bar 74: to the left; arm 60: to the left, connecting bar 74: to the right) and/or the actuators act on arm 60 and connecting bar 72, respectively, such that their movements are not synchronized with respect to phase and amplitude (e.g. arm 60 moves faster to the right than connecting bar 74), rotations in active rotational degree of freedom AR1 are provided with respect to output section 22.

In the embodiments of FIG. 15, serial arrangement of parallelogram structure and hinge 67 may be replaced by a single bar having hinges of the solid state compliant joint type at its ends.

An embodiment of this type is illustrated in FIG. 16, which further illustrates an example of a monolithical design of planar joint arrangement 12.

FIG. 17 illustrates a parallel kinematic structure comprising joint arrangements having the embodiment of FIG. 16 and anti-planar joint arrangements 14 having the embodiment of FIG. 9.

It is noted that the parallel kinematic structure may include at least one anti-planar joint arrangement having a different embodiment (e.g. embodiments of FIGS. 10 to 13). This correspondingly applies to the planar joint arrangements wherein at least one of which may have the embodiment of FIG. 15.

FIG. 18 schematically represents a parallel kinematic structure having, with respect to tool center point 8, three active translational degrees of freedom T1, T2, T3 and three constrained rotational degrees of freedom R1, R2 and R3. The constrained rotational degrees of freedom may be achieved by connection(s) to fixed location(s) or blocking thereof.

FIG. 19 illustrates the degrees of freedom of FIG. 18 associated to kinematic chains $10_1$, $10_2$ and $10_3$. Degrees of freedom of one of the kinematic chains of FIG. 19 are illustrated in FIG. 20. The above observations with respect to FIG. 5 correspondingly apply here.

FIG. 21 illustrates an embodiment of a kinematic chain 10 having the degrees of freedom of FIG. 20. The above observations with respect to FIG. 7 correspondingly apply to FIG. 21. This also applies with respect to anti-planar joint arrangement 14 and embodiments thereof illustrated in FIGS. 9 to 13.

FIG. 22 shows the planar joint arrangement 12 of FIG. 21, which provides an active translational degree of freedom AT1. Further, planar joint arrangement 12 provides a passive translational degree of freedom PT1.

FIG. 23 illustrates an example of the embodiment of FIG. 22, which example may be of monolithical design. Planar joint arrangement 12 comprises a parallelogram arrangement 82 and a parallelogram arrangement 84. Parallelogram arrangement 82 comprises two beams 86 connected with a base bar 88 and an arm 90. Arm 90 forms, on its other end, a section acting as base bar 92 for parallelogram arrangement 84. Parallelogram arrangement 84 includes two beams 94 connected to base bar 92 and on their other ends connected with connecting bar 96. In at least one of the parallelogram arrangements 82 and 84, the beams could be replaced by hinged bars.

Parallelogram arrangement 84 allows movements in directions of passive translational degree of freedom PT1. Parallelogram arrangement 82 provides actuated/generated movements in directions of active translational degree of freedom AT1. Such movements may be effected by an actuator coupled with arm 90 such that deformation of parallelogram arrangement 82 (particularly its hinges) provides motion of arm 90 in horizontal direction in the drawing plane of FIG. 23.

FIG. 24 schematically illustrates an embodiment of kinematic chain 10 of FIG. 21 including anti-planar joint arrangement 14 having the embodiment of FIG. 11 and planar joint arrangement having the embodiment of FIG. 23 with beams 86 and 94 having reinforced central parts. FIG. 24 further shows an actuator 98 acting on parallelogram arrangement 82. An embodiment of parallel kinematic structure 2 including three kinematic chains according to FIG. 24 is illustrated in FIG. 25.

FIG. 26 schematically represents a parallel kinematic structure having three constrained rotational degrees of freedom R1, R2 and R3 and one active translational degree of freedom T2. A kinematic chain 10 for such a parallel kinematic structure is shown in FIG. 27. FIG. 28 shows anti-planar joint arrangement 14 of FIG. 27 having one passive translational degree of freedom PT1. This degree of freedom may be provided by a single prismatic joint.

In FIG. 29, anti-planar joint arrangement 14 of FIGS. 27 and 28 uses a parallelogram arrangement having two bars with their ends terminated by pivot joints. These bars can be replaced by beams or notched bars (see FIGS. 10 and 11). It is noted that any prismatic joints suitable for use in a parallel kinematic structure according to the present invention may be substituted by the embodiment of FIG. 29.

FIG. 30 schematically represents a parallel kinematic structure having three actuated degrees of freedom, namely two translational degrees of freedom T1 and T2 and one rotational degree of freedom R3. A kinematic chain 10 for such a parallel kinematic structure is illustrated in FIG. 31. Planar joint arrangement 12 of FIG. 31 is also shown in FIG. 32, wherein planar joint arrangement 12 provides an active translational degree of freedom AT1, an active translational degree of freedom AT2 and an active rotational degree of freedom AR1.

A different embodiment of planar joint arrangement for kinematic chain 10 of FIG. 31 is illustrated in FIG. 33. Here, planar joint arrangement 12 includes three sub chains 12$_1$, 12$_2$ and 12$_3$. Sub chain 12$_1$ provides active translational degree of freedom AT1, sub chain 12$_2$ provides active translation degree of freedom AT2 and sub-chain 12$_3$ provides active rotational degree of freedom AR1. As can be seen in FIG. 33, the sub-chain allows arrangement of the actuated parts on base section 20. As a result, the "heavier" parts must not be moved. Further, FIG. 33 illustrates the aspect of the present invention according to which positions/locations of parts of a planar joint arrangement may be interchanged without effect on the overall behavior.

The invention claimed is:
1. A parallel kinematic structure comprising:
  at least two kinematic chains being functionally arranged in parallel;
  each of the at least two kinematic chains
    having, at a moveable end thereof, at least one degree of freedom, and
    comprising a passive anti-planar joint arrangement having a translational degree of freedom and two rotational degrees of freedom,
    each anti-planar joint arrangement having an input section and an output section;
  at least one of the kinematic chains comprising a planar joint arrangement
    having at least one translational degree of freedom and, optionally, at least one rotational degree of freedom, and
    the planar joint arrangement having an output section, wherein
    the input section of the anti-planar joint arrangement and the output section of the respective planar joint arrangement are coupled; and
  a moveable end-effector section coupled with the output sections of the anti-planar joint arrangements,
wherein
  the planar joint arrangement includes at least one parallelogram arrangement providing the at least one translational degree of freedom of the planar joint arrangement.

2. The parallel kinematic structure of claim 1, wherein the at least one planar joint arrangement is adapted for active movements in at least one of its degrees of freedom.

3. The parallel kinematic structure of claim 1, wherein at least one of the anti-planar joint arrangements, the planar joint arrangement, the kinematic chains and the parallel kinematic structure is are formed as a monolithic piece or part.

4. The parallel kinematic structure of claim 1, wherein at least one of the anti-planar joint arrangements comprises at least one solid state compliant joint providing movement in at least one of the degrees of freedom of the anti-planar joint arrangement by at least one of local elastic deformation and distributed elastic deformation.

5. The parallel kinematic structure of claim 1, wherein at least one of the at least one planar joint arrangement comprises at least one solid state compliant joint providing movement in at least one of the degrees of freedom of the planar joint arrangement by at least one of local elastic deformation and distributed elastic deformation.

6. The parallel kinematic structure of claim 1, wherein at least two of the degrees of freedom of the anti-planar joint arrangement are orthogonal to each other.

7. The parallel kinematic structure of claim 1, wherein the translational degree of freedom of the anti-planar joint arrangement is perpendicular to a plane defined by the rotational degrees of freedom of the anti-planar joint arrangement.

8. The parallel kinematic structure of claim 1, wherein at least two degrees of freedom of the planar joint arrangement are orthogonal to each other.

9. The parallel kinematic structure of claim 1, wherein a rotational degree of freedom of the planar joint arrangement is perpendicular to a plane defined by the translational degrees of freedom of the planar joint arrangement.

10. The parallel kinematic structure of claim 1, wherein the anti-planar joint arrangement comprises at least two kinematic sub-chains functionally arranged in parallel.

11. The parallel kinematic structure of claim 10, wherein the at least two kinematic sub-chains comprise at least one solid state compliant joint providing movement by at least one of local elastic deformation and distributed elastic deformation.

12. The parallel kinematic structure of claim 10, wherein the at least two kinematic sub-chains respectively have output ends comprised by the output section of planar joint arrangement.

13. The parallel kinematic structure of claim 10, wherein the at least two kinematic sub-chains respectively have input ends comprised by the input section of planar joint arrangement.

14. The parallel kinematic structure of claim 1, wherein the planar joint arrangement comprises at least two kinematic sub-chains functionally arranged in parallel.

15. The parallel kinematic structure of claim 14, wherein the at least two kinematic sub-chains comprise at least one solid state compliant joint providing movement by at least one of local elastic deformation and distributed elastic deformation.

16. The parallel kinematic structure of claim 14, wherein the at least two kinematic sub-chains respectively have an output end comprised by the output section of planar joint arrangement.

* * * * *